United States Patent
Griffin et al.

(10) Patent No.: US 9,319,442 B2
(45) Date of Patent: Apr. 19, 2016

(54) REAL-TIME AGENT FOR ACTIONABLE AD-HOC COLLABORATION IN AN EXISTING COLLABORATION SESSION

(71) Applicant: Cisco Technology, Inc., San Jose, CA (US)

(72) Inventors: Keith Griffin, Oranmore (IE); Jonathan D. Rosenberg, Freehold, NJ (US)

(73) Assignee: Cisco Technology, Inc., San Jose, CA (US)

( * ) Notice: Subject to any disclaimer, the term of this patent is extended or adjusted under 35 U.S.C. 154(b) by 20 days.

(21) Appl. No.: 14/288,752

(22) Filed: May 28, 2014

(65) Prior Publication Data

US 2015/0350258 A1   Dec. 3, 2015

(51) Int. Cl.
*H04N 7/15* (2006.01)
*H04L 29/06* (2006.01)

(52) U.S. Cl.
CPC .......... *H04L 65/1093* (2013.01); *H04L 65/403* (2013.01); *H04N 7/15* (2013.01)

(58) Field of Classification Search
CPC ........... H04N 7/15; H04N 7/14; H04N 7/141; H04N 7/142
USPC .............................. 348/14.01–14.16; 709/204
See application file for complete search history.

(56) References Cited

U.S. PATENT DOCUMENTS

| | | | |
|---|---|---|---|
| 7,797,345 B1 | 9/2010 | Martino et al. | |
| 7,818,392 B1 | 10/2010 | Martino et al. | |
| 7,818,394 B1 | 10/2010 | Lawler et al. | |
| 7,831,684 B1 | 11/2010 | Lawler et al. | |
| 7,844,671 B1 | 11/2010 | Lawler et al. | |
| 7,848,265 B2 | 12/2010 | Levy et al. | |
| 7,856,449 B1 | 12/2010 | Martino et al. | |
| 7,860,889 B1 | 12/2010 | Martino et al. | |
| 8,010,619 B1 | 8/2011 | Lawler et al. | |
| 8,260,252 B2 | 9/2012 | Agarwal | |
| 8,902,279 B2* | 12/2014 | Calman et al. | 348/14.08 |
| 2002/0016786 A1 | 2/2002 | Pitkow et al. | |
| 2003/0028596 A1 | 2/2003 | Toyota et al. | |
| 2004/0122803 A1 | 6/2004 | Dom et al. | |
| 2004/0243417 A9* | 12/2004 | Pitts et al. | 704/276 |

(Continued)

OTHER PUBLICATIONS

Braun et al., "People Tagging & Ontology Maturing: Towards Collaborative Competence Management," 8th International Conference on the Design of Cooperative Systems (COOP '08), May 2008, 24 pages.

(Continued)

*Primary Examiner* — Melur Ramakrishnaiah
(74) *Attorney, Agent, or Firm* — Edell, Shapiro & Finnan, LLC

(57) ABSTRACT

A method is provided for use in connection with a communication session between two or more participants. The communication session may be an online/web-based meeting, voice call, video call, instant messaging session, etc. Interactions between two or more participants of the communication session are monitored in order to identify an additional participant for the communication session based on a topical context of the interactions. A request is sent to the additional participant to join the communication session. Before the request is sent to the additional participant, the participants in the existing communication session may be notified with a prompt inquiring as to whether the additional participant should be contacted to join the existing communication session.

20 Claims, 11 Drawing Sheets

(56) References Cited

U.S. PATENT DOCUMENTS

| | | | |
|---|---|---|---|
| 2007/0005698 A1* | 1/2007 | Kumar et al. | 709/204 |
| 2007/0067405 A1 | 3/2007 | Eliovson | |
| 2007/0244970 A1* | 10/2007 | Watanabe et al. | 709/204 |
| 2008/0052387 A1 | 2/2008 | Heinz et al. | |
| 2008/0140643 A1 | 6/2008 | Ismalon | |
| 2008/0294768 A1 | 11/2008 | Sampson et al. | |
| 2009/0012833 A1 | 1/2009 | Kuhlke et al. | |
| 2009/0018918 A1 | 1/2009 | Moneypenny et al. | |
| 2009/0144075 A1 | 6/2009 | Flinn et al. | |
| 2009/0287694 A1 | 11/2009 | McGowan et al. | |
| 2010/0030713 A1 | 2/2010 | Simpson et al. | |
| 2010/0205541 A1 | 8/2010 | Rapaport et al. | |
| 2010/0268661 A1 | 10/2010 | Levy et al. | |
| 2010/0293125 A1 | 11/2010 | Simmons et al. | |
| 2010/0332542 A1 | 12/2010 | Jackson | |
| 2011/0112975 A1 | 5/2011 | McQueen | |
| 2011/0213785 A1 | 9/2011 | Kristiansson et al. | |
| 2011/0320423 A1 | 12/2011 | Gemmell et al. | |
| 2012/0001919 A1 | 1/2012 | Lumer | |
| 2012/0042013 A1 | 2/2012 | Roman et al. | |
| 2012/0078713 A1 | 3/2012 | Smith et al. | |
| 2012/0084188 A1 | 4/2012 | Zuber | |
| 2012/0166438 A1 | 6/2012 | Wu et al. | |
| 2012/0254184 A1 | 10/2012 | Choudhary et al. | |
| 2012/0296967 A1 | 11/2012 | Tao et al. | |
| 2014/0025734 A1 | 1/2014 | Griffin | |

OTHER PUBLICATIONS

Spreading Activiation Aug. 8, 2012, [online], [retrieved on Jan. 1, 2013] Retrieved from Wikipedia using Internet <URL: http://en.wikipedia.org/wiki/Spreading_activation> 3 pages.

Ester, "Recommendation in Social Networks," Tutorial at RecSys 2013, Simon Fraser University, Proceedings of the 7th ACM Conference on Recommender systems, Oct. 2013, 97 pages.

Marek Ciglan et al., "SGDB- Simple Graph Database Optimized for Activation Spreading Computation", Database Systems for Advanced Applications, 15th International Conference, DASFAA 2010, International Workshops: GDM, BenchmarX, MCIS, SNSMW, DIEW, UDM, Tsukuba, Japan, Apr. 1, 2010, pp. 45-56.

S. Mokhtar, et al., "A Self-Organising Directory and Matching Service for Opportunistic Social Networking", SNS'10, Apr. 13, 2010, Paris, France, ACM 978-1-4503-0080-3, (6 pages).

http://sioc-project.org/ontology.

http://www.w3.org/2004/OWL/.

Kasarapu et al., "Exploring Social Patterns in Moile Data", Apr. 2010, IEEE, p. 62-68.

Jin et al., "A Web Recommendation System Based on Maximum Entropy", Apr. 2005, IEEE, vol. 1, p. 213-218.

Lu et al., "The Topic-Perspective Model for Social Tagging Systems", Jul. 2010, ACM, p. 683-691.

Gaston et al., "Topic-Based Social Network Analysis for Virtual Communities of Interests in the Dark Web", Jul. 2010, ACM, Article No. 9, p. 1-9.

Bhattacharya et al., "A Latent Dirichlet Allocation Model for Entity Resolution," Aug. 1, 2005, pp. 1-15.

Blei et al., "Supervised and Relational Topic Models", Department of Computer Science Princeton University, Oct. 5, 2009, 58 pages.

Pathak et al., "Social Topic Models for Community Extraction," Aug. 24, 2008, The 2nd SNA-KDD Workshop '08, 10 pages.

Tuulos et al., "Combining Topic Models and Social Networks for Chat Data Mining," Jul. 4, 2004 HIIT Technical Report 2004-13, 11 pages.

Xu et al., "Named Entity Mining from Click-Through Data Using Weakly Supervised Latent Dirichlet Allocation," KDD '09, (2009), 9 pages.

* cited by examiner

US 9,319,442 B2

REAL-TIME AGENT FOR ACTIONABLE AD-HOC COLLABORATION IN AN EXISTING COLLABORATION SESSION

TECHNICAL FIELD

The present disclosure relates to systems for establishing collaboration sessions.

BACKGROUND

Online collaboration sessions are common in business environments where participants may be at different locations. These collaboration sessions can simulate in-person meetings. The session supports audio and video, as well as the sharing of content presented by one participant to other participants. A meeting/collaboration server is commonly used to route the audio, video and other content among the plurality of participants.

DESCRIPTION OF EXAMPLE EMBODIMENTS

Overview

A method is provided for use in connection with a communication session between two or more participants. The communication session may be an online/web-based meeting, voice call, video call, instant messaging session, etc. Interactions between two or more participants of the communication session are monitored in order to identify an additional participant for the communication session based on a topical context of the interactions. A request is sent to the additional participant to join the communication session. Before the request is sent to the additional participant, the participants in the existing communication session may be notified with a prompt inquiring as to whether the additional participant should be contacted to join the existing communication session.

Example Embodiments

During collaboration/communication sessions it is often determined that additional people or resources are needed to make the session more productive. Non-limiting examples of such communication/collaboration sessions include online/web-based meeting sessions (such as those supporting by Cisco Systems, Inc.'s WebEx® service), video conference sessions, instant messaging sessions, voice audio calls and conferences, video calls, etc.

Presented herein are techniques for automated contextual identifying and suggesting of additional participants for inclusion in a communication session. A software agent monitors communications between users on multiple modalities (voice, instant messaging, video, etc.) during a communication session to understand the semantics of the discussion of the meeting. This monitoring is performed for a live (real-time) communication session and not an offline or on asynchronous content (such as email exchanges, voice mail messages, postings on a website or social network page, etc.). Thus, the term "communication session" between at least two participants as used herein is meant to refer to a live/real-time communication session.

The topic of the discussion between the users is determined. For example, voice recognition using entity extraction and natural language processing techniques may be employed to determine the semantics and create a meaning for the discussion in the form of a topic. Based on what the software agent determines to be a topic of the communication session, the agent presents an opportunity or action to bring one or more additional participants into the communication session or into a future communication session. If necessary, scheduling of a future meeting is achieved, together with reserving the necessary resources (e.g., a video conference room if one of the participants is at a remote location).

Figure 1:
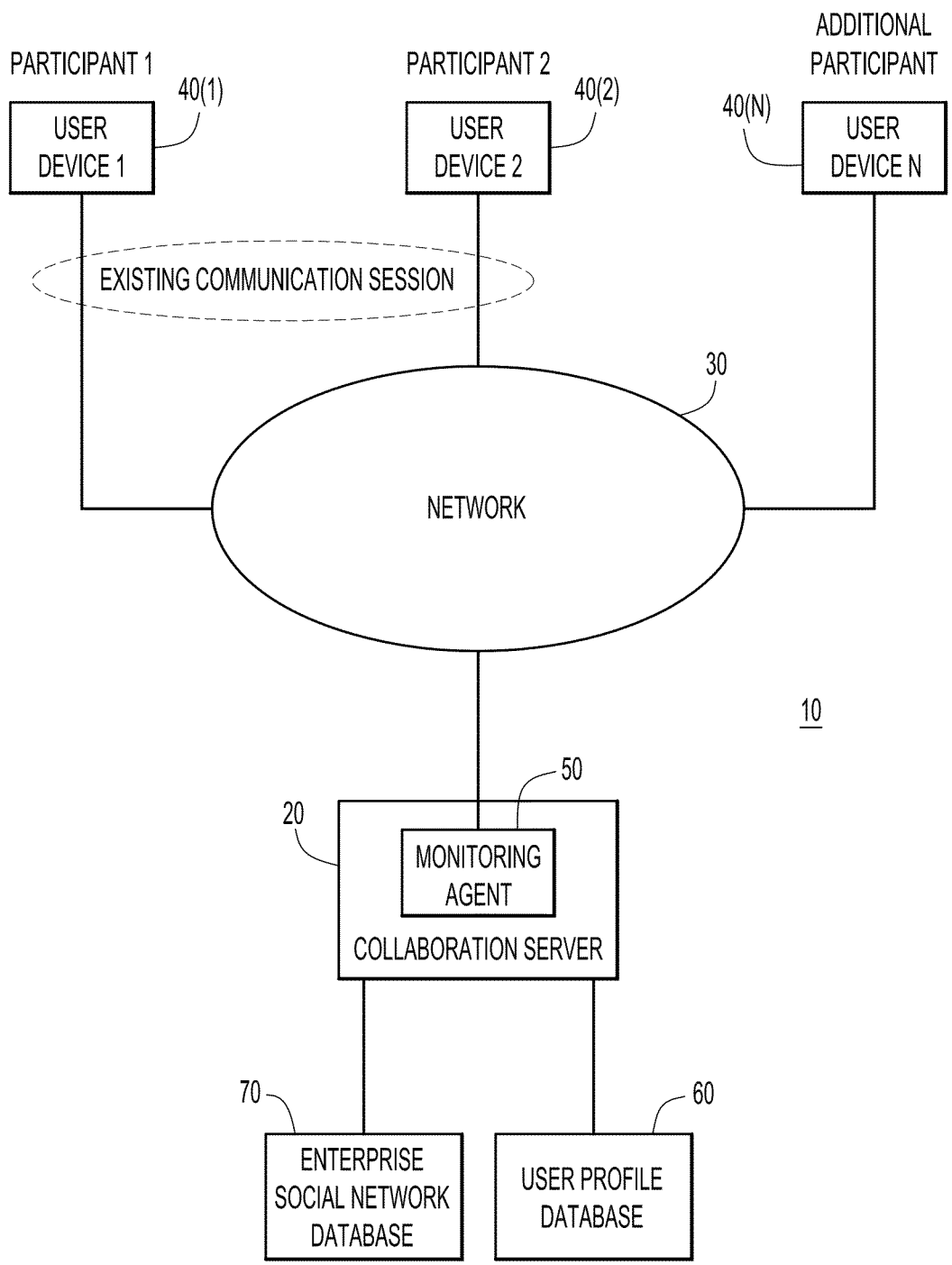
FIG. 1 is a block diagram of a system configured to support ad-hoc collaboration in an existing collaboration/communication session, according to an example embodiment.

Reference is first made to FIG. 1. FIG. 1 shows a system 10 including a collaboration server 20, a network 30 and a plurality of user devices 40(1)-40(N), each associated with at least one participant, e.g., a corresponding one of participants 1-N. The collaboration server 20 includes a monitoring agent 50 that monitors content and interactions between participants in a communication session to identify one or more topics of the communication session, identify one or more additional participants that may be relevant and helpful for the communication session, and suggest to the two or more participants that the one or more additional participants join the communication session. The network 30 may be any combination of a wired or wireless local area network, wide area network (e.g., Internet), wireless wide area network.

The monitoring agent 50 detects names, topics and context that a name is mentioned during a communication session, in order to identify/find that person(s), prompt the meeting participants to inquire as to whether to contact that additional participant person(s) to join into the communication session, and then contact those persons (called "additional participants" herein) to bring them into the meeting. A user profile database 60 is provided that serves as a directory of users from which the monitoring agent 50 can search for additional participants as to expertise or responsibility, using one or more key word search terms obtained from the determined topics of the meeting. In addition, an enterprise social network database 70 may be used to search and identify relevant additional participants based on a match of the key word terms identified from the communication session and the profile/expertise of users listed in the social network database 70. The databases 60 and 70 are just examples, and it should be understood that any of a variety of databases, internal to an enterprise, as well as external to an enterprise, may be used to identify one or more relevant additional participants to an existing communication session. Thus, the collaboration server 20 analyzes, based on the one or more subject matter terms and/or names, one or more of: a personal contacts directory and persons in an enterprise social network community of the participants in the meeting, to identify the additional participant.

As an alternative, the functions of the monitoring agent 50 could reside in a local client application that runs on a user device, and wherein the output of the local monitoring agent 50 contains key word terms or even participant names that are supplied to the collaboration server 20 for sending out a suggestion/prompt to participants of the existing communication session.

FIG. 1 shows an example in which participant 1 at user device 40(1) and participant 2 at user device 40(2) are engaged in a communication session. The monitoring agent 50 monitors the audio, video, text and other exchanges between the participants, to generate one or more key word search terms, or even names of additional participants. The monitoring agent 50 may refer to the user profile database 60 and/or enterprise social network database 70 to generate one or more names of additional participants to suggest joining the existing communication session between participant 1 and participant 2.

Figure 2:
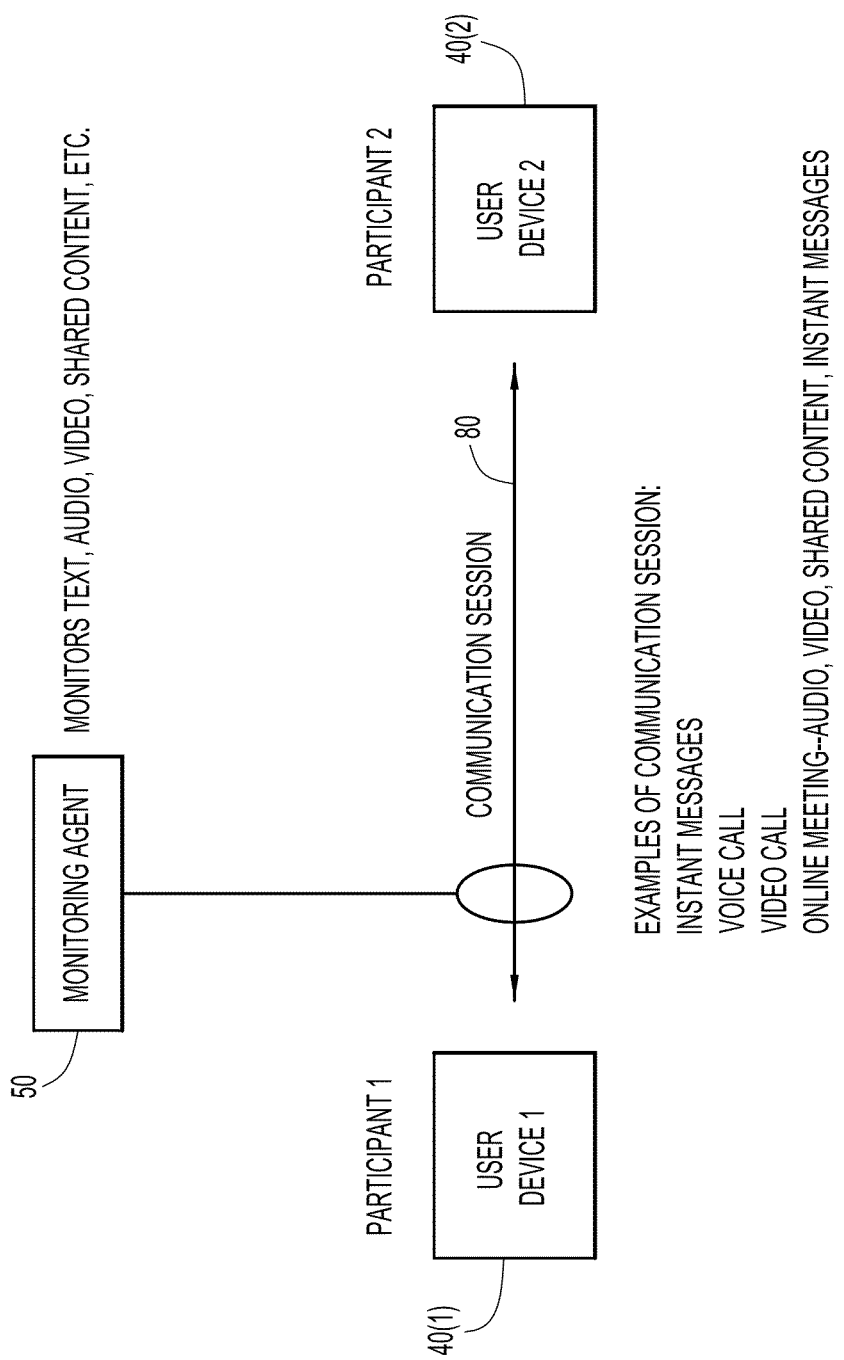
FIG. 2 is a diagram depicting operations of a monitoring agent used to monitor content of a communication session between at least two participants in order to suggest adding an additional participant to the communication session, according to an example embodiment.

Turning now to FIG. 2, there is shown in more detail the operations of the monitoring agent. The existing communication session is shown at reference numeral 80. Examples of the communication session include instant messaging, a voice call, a video call, and an online/web-based meeting that includes one or more of audio, video, shared content and instant messages. The monitoring agent 50 monitors text, audio, video, shared content, etc., of the communication session using audio-to-text, video analysis, text capture, and any other suitable technique now known or hereinafter developed to obtain one or more key word terms from exchanges between participants in the communication session.

Figure 3:
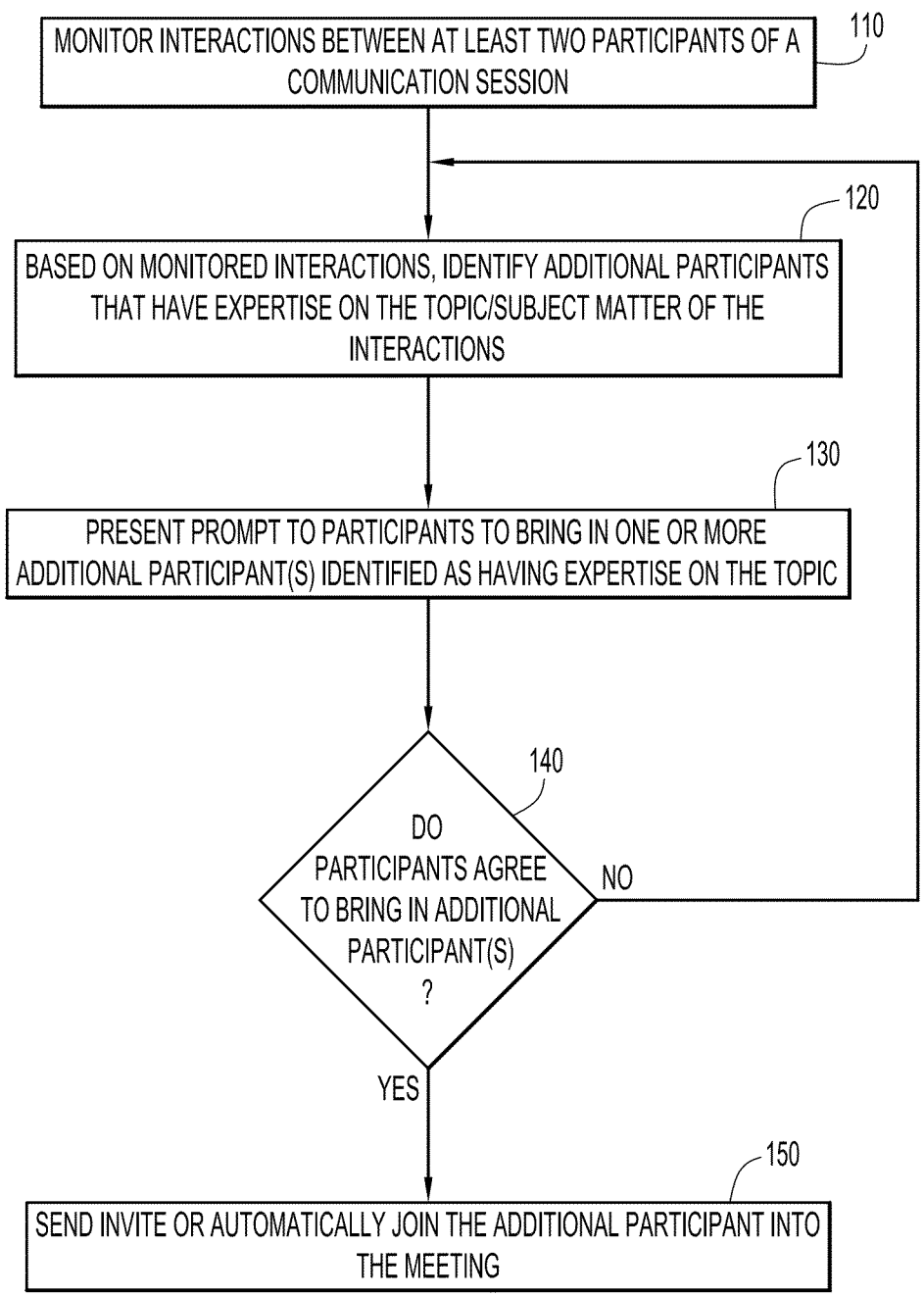
FIG. 3 is a flow chart depicting operations performed to support ad-hoc collaboration in an existing collaboration/communication session, according to an example embodiment.

Turning now to FIG. 3, a flow chart is shown for a method 100 performed by the collaboration server 20, according to embodiments presented herein. At 110, interactions between at least two participants of a communication session are monitored. The various monitoring modalities are described above. At 120, based on the monitored interactions, one or more additional participants are identified that have expertise or relevance to the topic/subject matter of the interactions. In some instances, a person's name, first name or first name and last name, may be spoken by one of the participants in the communication session, and that name is used directly to identify an additional participant. At 130, a prompt is presented to the participants of the communication session, to bring in one or more additional participants identified as having expertise or relevance to a topic detected during the communication session. The name(s) of the additional participant(s) are presented in the prompt to the participants.

At 140, it is determined whether the existing participants to the communication session agree to bring in the identified additional participant(s). If the existing participants agree to bring in the additional participant(s), then at 150, the collaboration server sends an invite or automatically joins the additional participant(s) to the communication session. In some cases, it may take approval from only one of the participants of the communication session, such as the host of the meeting, or a person with more senior status within an organization, to approve to bring in an additional participant to the meeting, regardless of whether one or more other participants in the communication session agree to bring in that additional participant.

To summarize, the method depicted in FIG. 3 suggests to existing participants to bring in other participants related to the exchanges during the existing communication session. This could be as a result of a person or team being named or by analyzing requests for follow up in an area of expertise resulting in the relevant participant(s) being identified by the same contextual search technique and presented back to the attendees of the meeting. The presentation of potential additional participants/attendees may be made in a non-intrusive manner, offering additional context to the meeting in order to accelerate the completion of an additional task. For example, if a conversation goes like "We need the final call processing performance numbers from Bob before we can make a decision," the collaboration server 20 would identify Bob as the required person, determine his current availability, advertise his availability to the meeting attendees and offer a single click or gesture option to bring Bob immediately into the meeting.

Figure 4:
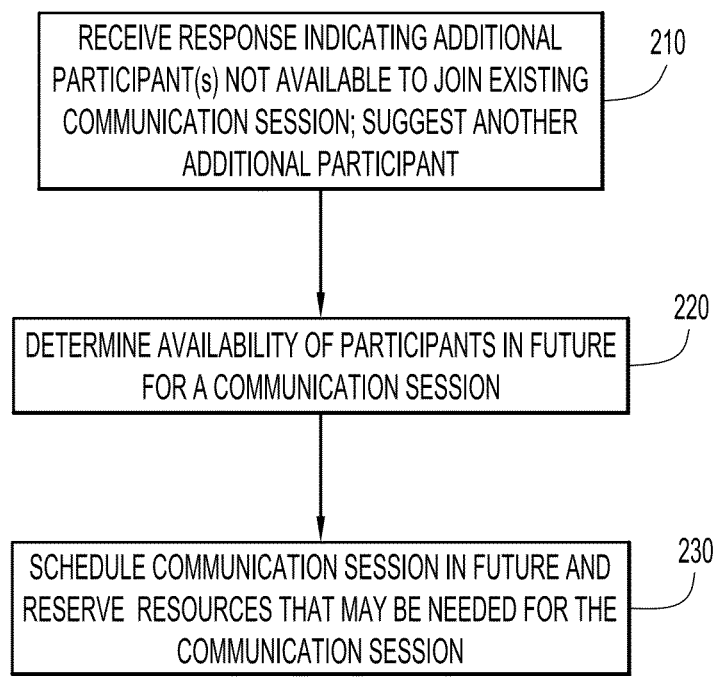
FIG. 4 is a flow chart depicting operations performed when the additional participant cannot join the existing communication session, according to an example embodiment.

Reference is now made to FIG. 4. FIG. 4 shows a flow chart for a method 200 performed when the additional participant is not available to join the existing communication session. At 210, a response is received indicating that the additional participant(s) is not available to join the existing communication session. It is possible that the collaboration server may identify and suggest another (different) additional participant. At 220, the collaboration server determines availability of the identified additional participants for a communication session in the future. In doing so, the collaboration server may access calendar information for all of the relevant parties in order to determine the appropriate day/time for the future communication session. At 230, the collaboration server 230 schedules the future communication session and reserves resources that may be needed for the session, such as a conference bridge, video conference endpoint equipment, meeting room, etc. Thus, for example, the collaboration server may determine that Bob is free tomorrow at 3 PM, and needs to know if everyone else is available then. The collaboration server could also determine, if Bob is not available now, whether there is someone else with the necessary expertise that is available now, or wait for Bob's availability and schedule another communication session at that time. Moreover, the collaboration server could send an instant message to Bob to see if he is free soon (within the hour), or in the next 10 minutes or sometime soon he can make himself available for a short ad-hoc meeting.

Figure 5:
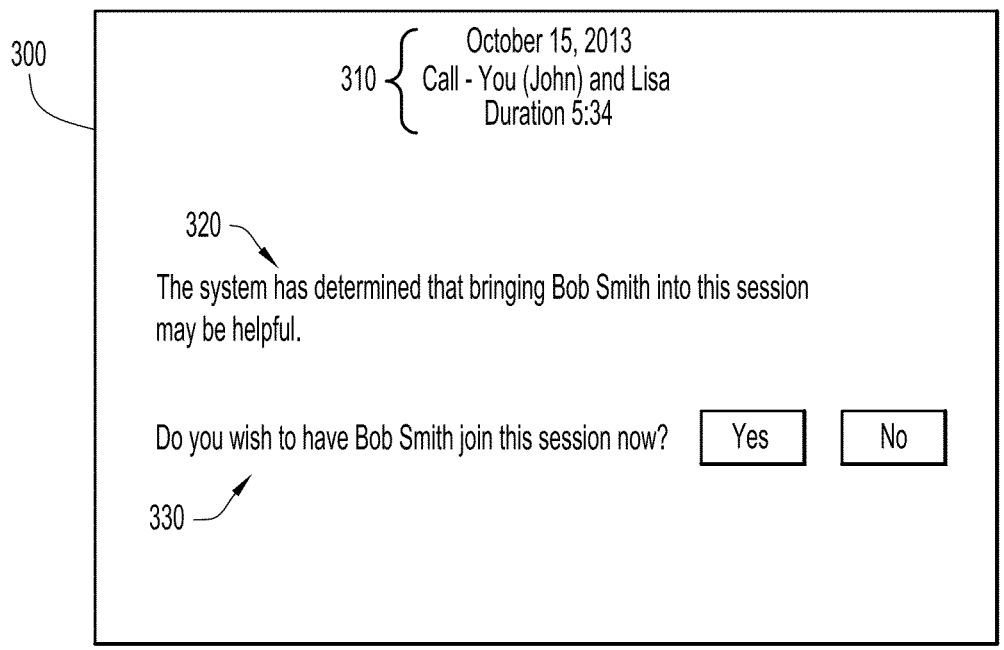
FIG. 5 is an example of a user interface screen that contains a prompt to a participant using a video or voice phone in the existing communication session, the prompt suggesting the adding of an additional participant to the communication session, according to an example embodiment.

Turning now to FIG. 5, an example user interface screen 300 is shown, particularly for a phone device display, e.g., during a voice or video call. In this example, the top of the screen contains information about the call (date, time, participants) shown at 310. At 320, a message notification is presented "The system has determined that bringing Bob Smith into this call may be helpful." At 330, a question is presented to the participant "Do you wish to have Bob Smith join this call now?" with Yes and No boxes that a user can select, accordingly.

Figure 6:
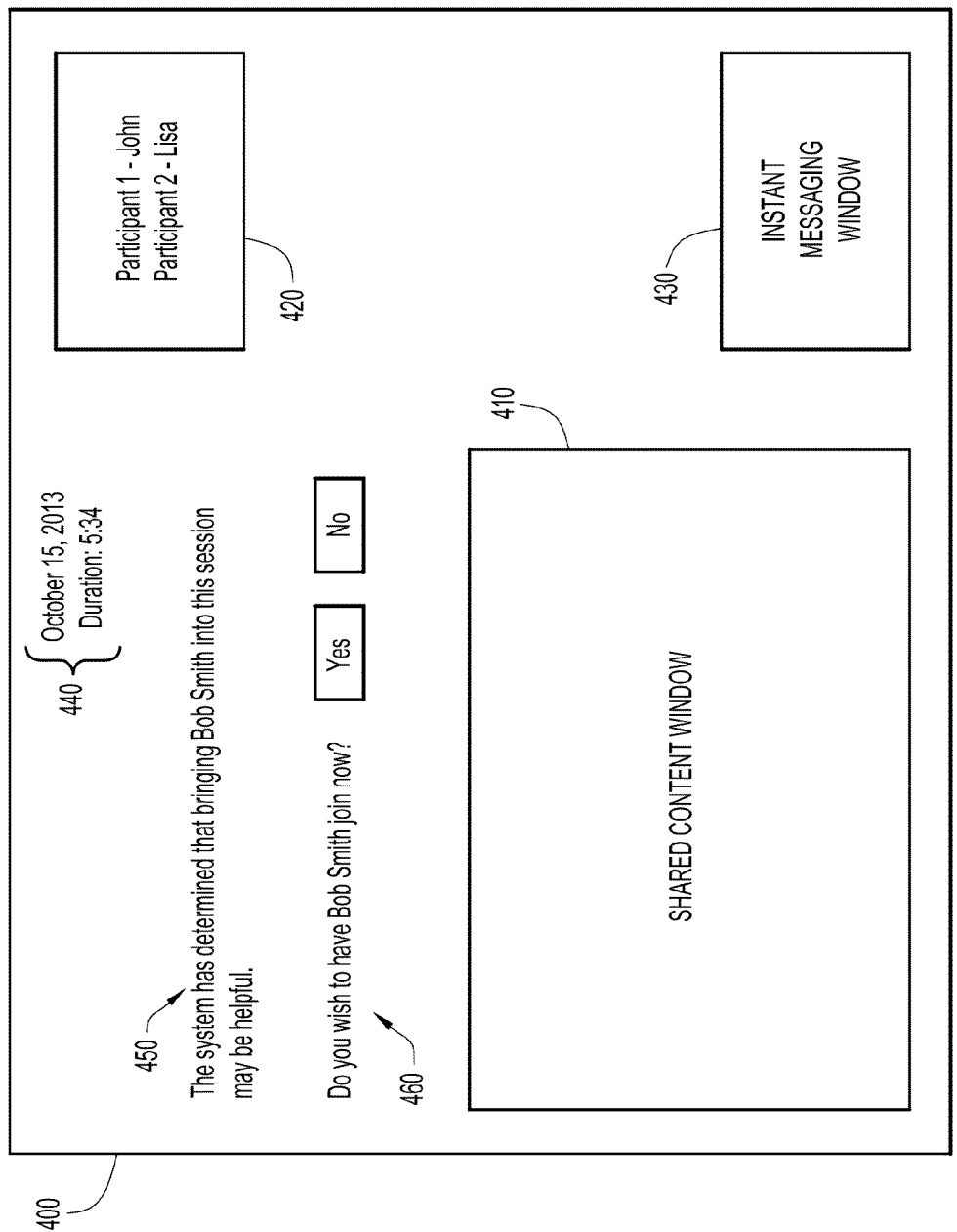
FIG. 6 is another example of a user interface screen in the existing communication session in which a prompt is presented to a participant in the existing communication session to add an additional participant, according to an example embodiment.

FIG. 6 shows an example of a user interface screen 400 for an online meeting session (e.g., WebEx session). In this example, there is a shared content window 410, a participant list 420 and an instant messaging window 430. The current date and duration of the session are shown at the top of the screen at 440. At 450, a text notification is presented "The system has determined that bringing Bob Smith into this call may be helpful." At 460, a question is presented to the participant "Do you wish to have Bob Smith join this call now?" with Yes and No boxes that a user can select, accordingly.

Figure 7:
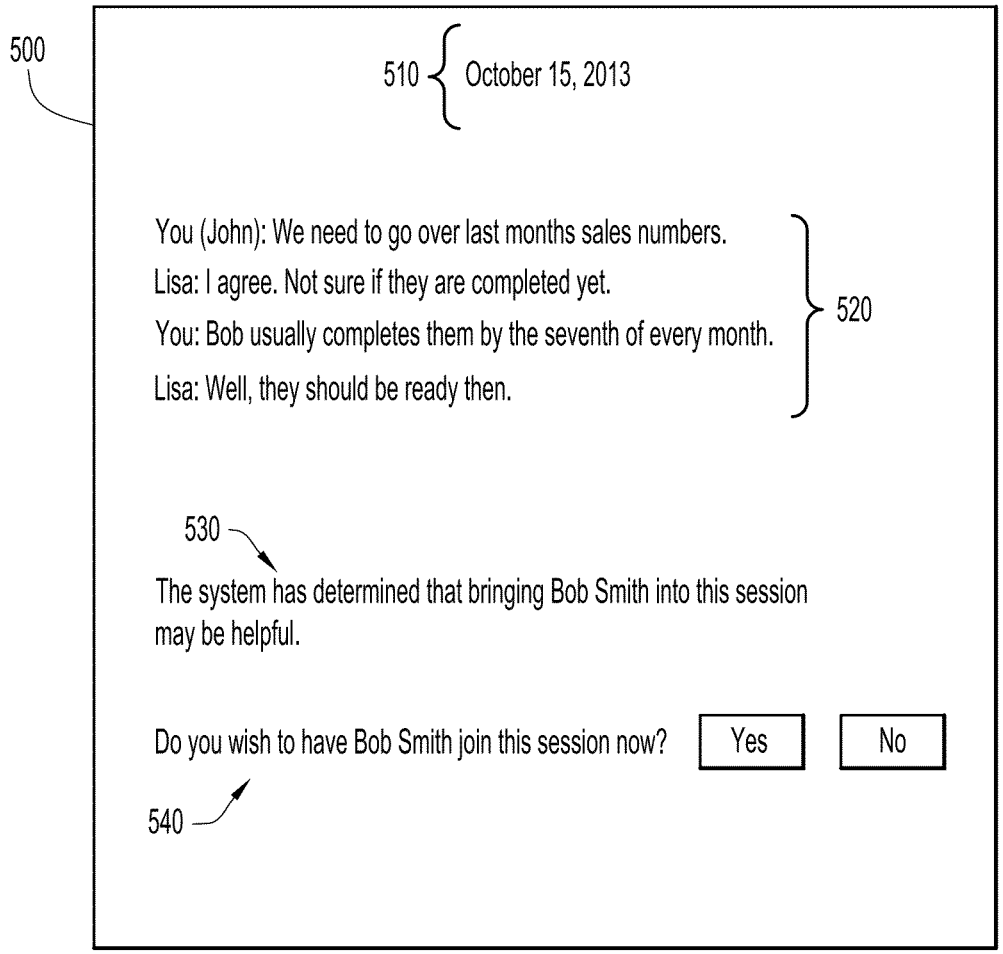
FIG. 7 is an example of a user interface screen presented during an instant messaging session between the two participants, where a prompt is presented to suggest adding an additional participant to the instant messaging session, according to an example embodiment.

FIG. 7 illustrates an example of a user interface screen 500 in an instant messaging session, in which a prompt is presented to join an additional participant. In this example, the top of the screen contains information about the session (date) shown at 510. At 520, the text of the ongoing instant messaging conversion is shown. At 530, a text notification is presented "The system has determined that bringing Bob Smith into this call may be helpful." At 540, a question is presented to the participant "Do you wish to have Bob Smith join this call now?" with Yes and No boxes that a user can select, accordingly.

Figure 8:
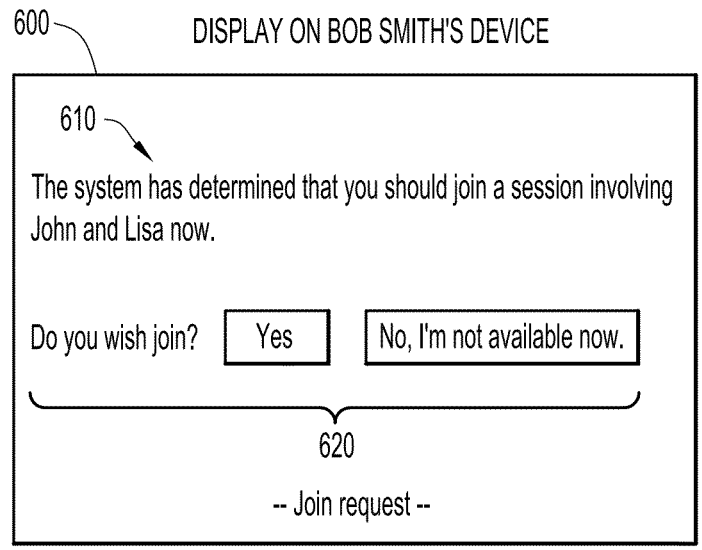
FIG. 8 is an example of a user interface screen of a join request sent to the additional participant's device, according to an example embodiment.
Figure 9:
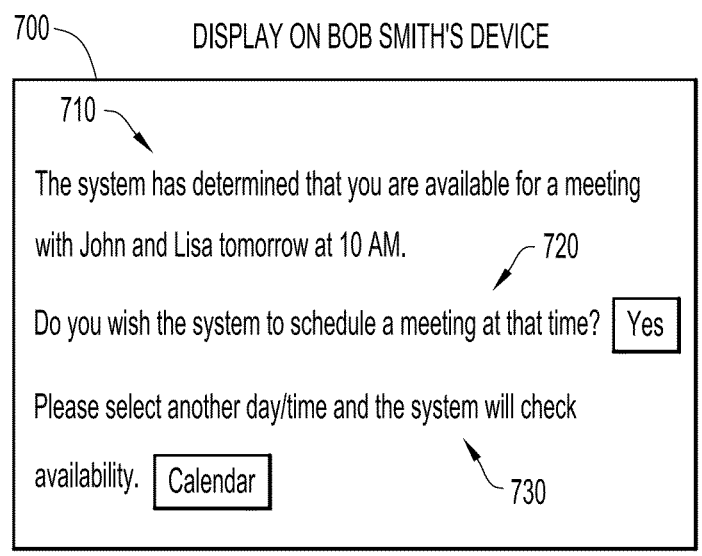
FIG. 9 is an example user interface screen presented to the additional participant and allowing the additional participant to decline the join request and select another day/time for a communication session with the other two participants, according to an example embodiment.

Reference is now made to FIGS. 8 and 9. These figures show examples of user interfaces presented on the additional participant's device when a join request is received from the collaboration server. In FIG. 8, a user interface screen 600 on Bob Smith's device (following the example referred to above) for a join request is shown. A text notification is presented at 610 "The system has determined that you should join a session involving John and Lisa now." At 620, the options of joining or declining are presented to the additional participant.

In FIG. 9, another example user interface screen 700 presented to the additional participant is shown. This screen is useful when the additional participant cannot join the current meeting, but wishes to have the system automatically suggest a time in the future to meet with the two participants, e.g., John and Lisa, in the current meeting, based on the calendar availability of the two existing participants and calendar availability of the additional participant. At 710, the text notification "The system has determined that you are available for a meeting with John and Lisa tomorrow at 10 AM." At 720, the additional participant is prompted to schedule a meeting at that time. If the suggested time is not suitable to the additional participant, then at 730, he/she is prompted to select another time by clicking a "Calendar" button and the system will automatically check for availability of the two participants, John and Lisa, or the system may display the additional participant's calendar to allow him/her to manually select a day/time for a future communication session.

Figure 10:
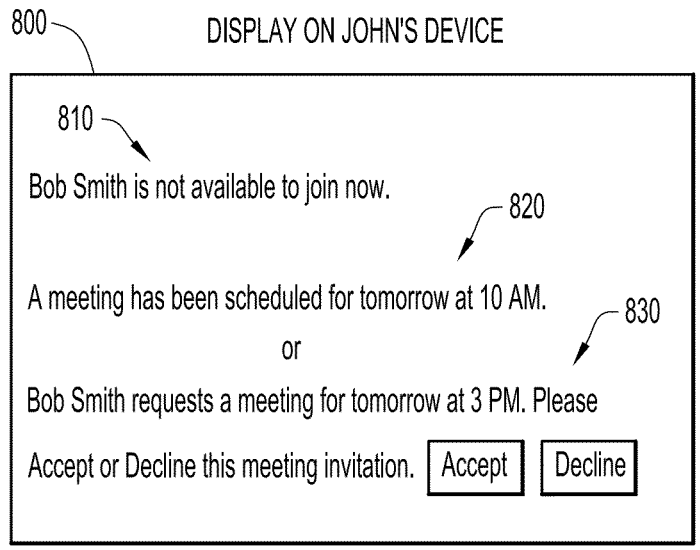
FIG. 10 is an example user interface screen showing a message presented to an existing participant, the message indicating that the additional participant cannot join, but can have a meeting in the future, according to an example embodiment.

Turning now to FIG. 10, an example of a user interface screen 800 is shown, which is presented to one of the participants in the current/existing session. At 810, a text notification is presented "Bob Smith is not available to join now," thereby notifying the participant (John) of the existing session that the additional participant (Bob) is not available to join now. At 820, a text notification may be presented "A meeting has been scheduled for tomorrow at 10 AM." or at 830, a text notification is presented "Bob Smith requests a meeting for tomorrow at 3 PM. Please Accept or Decline this meeting invitation."

FIGS. 8-10 are provided as examples of how participants of the existing session and the additional participant(s) may be notified about the status of bringing the additional participant to the existing session. It should be understood that there are numerous other notification mechanisms and schemes possible, which are within the scope and spirit of the examples presented herein.

Figure 11:
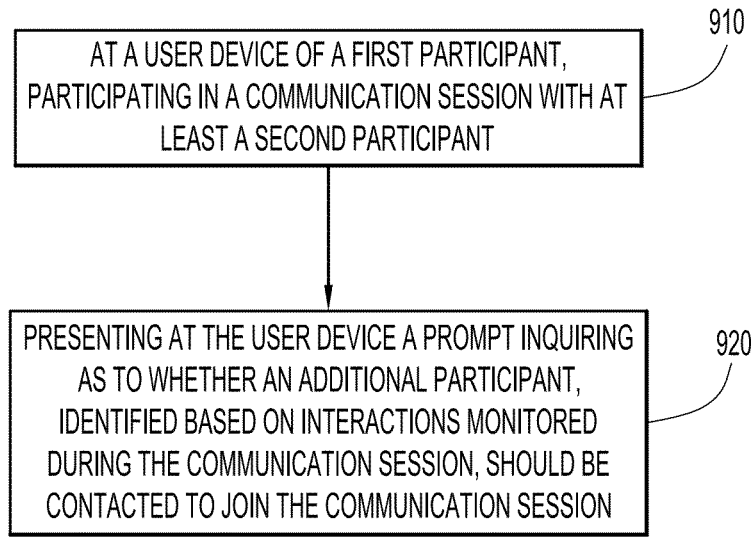
FIG. 11 is a flow chart depicting operations performed at a user device of an existing participant, according to an example embodiment.

Reference is now made to FIG. 11. FIG. 11 illustrates a flow chart for a method 900 involving operations performed at a user device of a participant of a communication session, arbitrary referred to as a "first" participant. At 910, the user device of the first participant participates in a communication session with at least a second participant. At 920, a prompt is presented at the user device of the first participant, the prompt inquiring as to whether an additional participant, identified based on interactions monitored during the communication session, should be contacted to join the communication session. The method may continue in which an indication is received from the first participant at the user device that the additional participant should be contacted to join the communication session. If the additional participant is not available to join the communication session, a message indicating as such may be presented to the first participant. Further still, the user device of the first participant may receive an invitation for a future communication session at a scheduled time in which the first participant, second participant and the additional participant are determined to be available.

Figure 12:
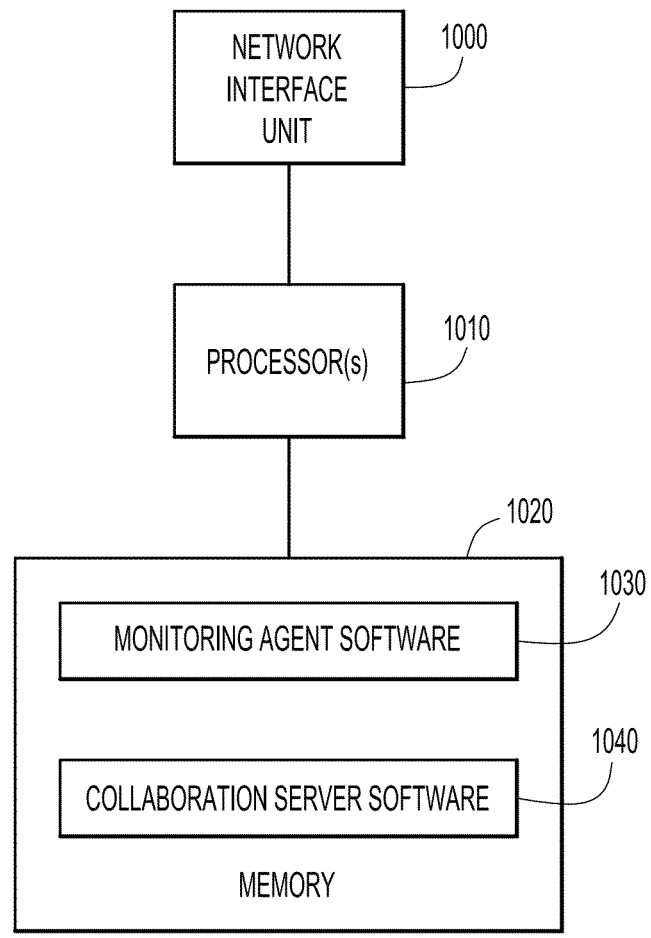
FIG. 12 is a block diagram of a collaboration server configured to perform the operations described herein, according to an example embodiment.

Turning now to FIG. 12, an example block diagram of the collaboration server 20 is shown. The collaboration server 20 is a computing apparatus (e.g., server) that includes a network interface unit 1000 configured to send and receive messages over a network, one or more processors 1010 and memory 1020. The memory 1020 stores executable instructions for monitoring agent software 1030 and collaboration server software 1040.

The memory 1020 may comprise read only memory (ROM), random access memory (RAM), magnetic disk storage media devices, optical storage media devices, flash memory devices, electrical, optical, or other physical/tangible memory storage devices. The processor 1010 is, for example, a microprocessor or microcontroller. In general, the memory 1020 may comprise one or more tangible (non-transitory) computer or processor readable storage media (e.g., a memory device) encoded with software comprising computer executable instructions and when the software is executed (by the processor 1010) it is operable to perform the operations described herein in connection with the monitoring agent software 1030 and collaboration server software 940. In particular, the collaboration server 20 performs the monitoring agent functions described herein when the processor 1010 executes the monitoring agent software 1030. Likewise, the collaboration server 20 performs various collaboration server operations when the processor executes the collaboration server software 1040.

Figure 13:
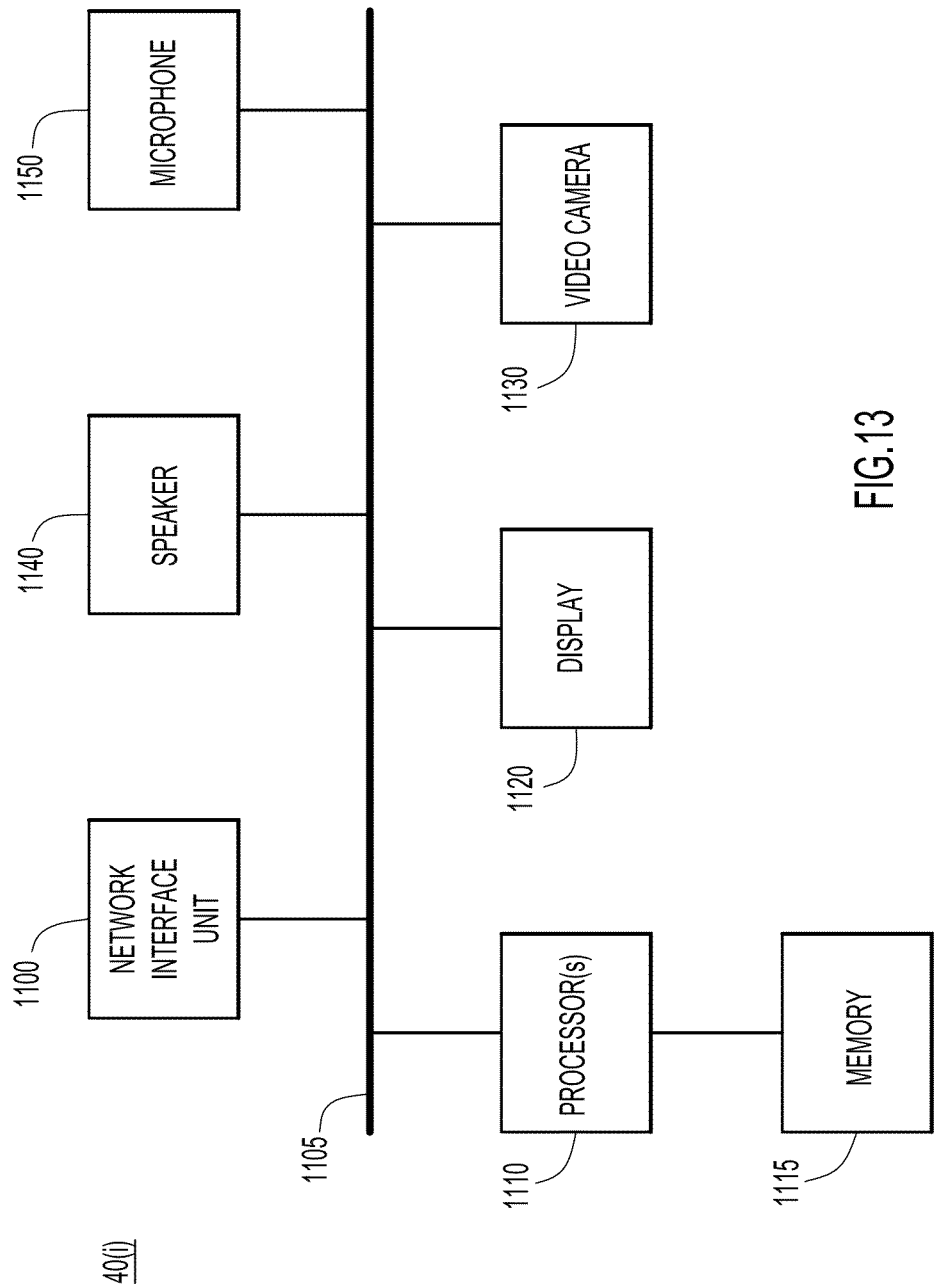
FIG. 13 is a block diagram of a user device configured to perform the operations depicted in FIG. 11, according to an example embodiment.

Reference is now made to FIG. 13. FIG. 13 illustrates a block diagram of a user device, generically identified by reference numeral 40(*i*), and is representative of any of the user devices referred to herein. The user device 40(*i*) is configured to perform the operations depicted in FIG. 11 and described herein. The user device 40(*i*) includes a network interface unit 1100, a bus 1105, one or more processors 1110, memory 1115, a display 1120, a video camera 1130, a speaker 1140 and a microphone 1150. A user interface (e.g., keyboard and mouse) may also be provided that is integrated or associated with the display 1120. Alternatively, the display 1120 is a touch screen display device.

The network interface unit 1100 may have wired and/or (wide area or local area) wireless network connectivity capability. The processor 1110 may be a microprocessor or microcontroller, that executes instructions stored in memory 1115, such as instructions for web browser, and a meeting plugin to web browser to support online meetings and other services managed by the collaboration server 20, such as instant messaging, video calls, voice calls, etc. In particular, the processor 1110 executes instructions stored in memory 1115 to enable the user device to perform the operations described herein.

To summarize, techniques are provided for automatically determining that another person may be needed or is useful to join an existing communication session, during the existing communication session, and to attempt to bring that person into the communication session now, if possible, or schedule another time in the future to have a meeting with that person.

In addition, as an additional feature, information learned by the monitoring agent may be used to retrieve other information, through the use of targeted queries with a set of default targets, e.g., a web search and/or additional targets, such as enterprise document storage, wiki pages, or other sources. The information is then presented back to the participants in the communication session, e.g., on the "share" function of an online meeting, to provide an assistance overlay to context of the conference of the meeting. The user interface for this additional information may be non-intrusive, where the user can scroll in some portion of the share view. Users can decide whether to click on the scrolling content during the share view.

In summary, in one form, a computer-implemented method is provided comprising monitoring interactions between two or more participants of a communication session to identify an additional participant for the communication session based on a topical context of the interactions; and sending to the additional participant a request to join the communication session.

Similarly, an apparatus is provided comprising a network interface unit configured to enable communications over a network; and a processor coupled to the network interface unit, wherein the processor is configured to monitor interactions between two or more participants of a communication session to identify an additional participant for the communication session based on a topical context of the interactions; and cause to be sent to the additional participant a request to join the communication session.

Moreover, a processor readable storage medium is provided that is encoded with instructions that, when executed by a processor, cause the processor to: monitor interactions between two or more participants of a communication session to identify an additional participant for the communication session based on a topical context of the interactions; and cause to be sent to the additional participant a request to join the communication session.

In another form, a computer-implemented method is provided comprising at a user device of a first participant, participating in a communication session with at least a second participant; and presenting at the user device a prompt inquiring as to whether an additional participant, identified based on interactions monitored during the communication session, should be contacted to join the communication session.

The above description is intended by way of example only.

What is claimed is:

1. A computer-implemented method comprising:
monitoring interactions between two or more participants of a communication session to identify an additional participant for the communication session based on a topical context of the interactions;
determining availability of the additional participant;
sending to the additional participant a request to join the communication session when it is determined that the additional participant is available to join the communication session;
accessing calendar information for the two or more participants and the additional participant when it is determined that the additional participant is not available to join the communication session;
determining, based on the calendar information, availability of the two or more participants and the additional participant for a future communication session at a future time that includes the two or more participants and the additional participant; and
scheduling the future communication session for the two or more participants and the additional participant based on the determined availability of the two or more participants and the additional participant at the future time.

2. The method of claim 1, wherein monitoring comprises monitoring one or more of: voice audio of the two or more participants, instant messages exchanged between the two or more participants, video of the two or more participants, and content shared by the two or more participants during the communication session.

3. The method of claim 2, wherein monitoring comprises determining one or more subject matter terms and/or names of one or more other persons in the interactions.

4. The method of claim 3, wherein monitoring comprises performing voice recognition and natural language processing techniques to determine one or more subject matter terms and/or names of one or more other persons.

5. The method of claim 3, further comprising analyzing, based on the one or more subject matter terms and/or names, one or more of: a personal contacts directory and persons in an enterprise social network community of the participants in the meeting, to identify the additional participant.

6. The method of claim 1, further comprising presenting to the two or more participants a prompt inquiring as to whether the additional participant should be contacted to join the communication session.

7. The method of claim 1, wherein sending comprises sending to the additional participant the request which contains an explanation that the additional participant has been automatically identified to join the communication session between the two or more participants.

8. The method of claim 1, further comprising receiving a response indicating that the additional participant is not available to join the communication session, and determining availability of resources for scheduling the future communication session that includes the additional participant.

9. The method of claim 8, further comprising reserving resources for the future communication session at the future time in which the two or more participants and the additional participants are determined to be available.

10. The method of claim 1, further comprising receiving a response indicating that the additional participant is not available to join the communication session, and identifying another additional participant to be contacted to join the communication session.

11. An apparatus comprising:
a network interface unit configured to enable communications over a network; and
a processor coupled to the network interface unit, wherein the processor is configured to:
monitor interactions between two or more participants of a communication session to identify an additional participant for the communication session based on a topical context of the interactions;
determine availability of the additional participant;
cause to be sent to the additional participant a request to join the communication session when it is determined that the additional participant is available to join the communication session;
access calendar information for the two or more participants and the additional participant when it is determined that the additional participant is not available to join the communication session;
determine, based on the calendar information, availability of the two or more participants and the additional participant for a future communication session at a future time that includes two or more participants and the additional participant; and
schedule the future communication session for the two or more participants and the additional participant based on the determined availability of the two or more participants and the additional participant at the future time.

12. The apparatus of claim 11, wherein the processor is configured to monitor one or more of: voice audio of the two or more participants, instant messages exchanged between the two or more participants, video of the two or more participants, and content shared during the meeting by the two or more participants.

13. The apparatus of claim 12, wherein the processor is configured to monitor by determining one or more subject matter terms and/or names of one or more other persons in the interactions.

14. The apparatus of claim 13, wherein the processor is configured to analyze, based on the one or more subject matter terms and/or names, one or more of: a personal contacts directory and persons in an enterprise social network community of the participants in the meeting, to identify the additional participant.

15. The apparatus of claim 11, wherein the processor is configured to generate for presentation to the two or more participants a prompt inquiring as to whether the additional participant should be contacted to join the communication session.

16. A non-transitory processor readable storage medium encoded with instructions that, when executed by a processor, cause the processor to:
monitor interactions between two or more participants of a communication session to identify an additional participant for the communication session based on a topical context of the interactions;
determine availability of the additional participant;
cause to be sent to the additional participant a request to join the communication session when it is determined that the additional participant is available to join the communication session;
access calendar information for the two or more participants and the additional participant when it is determined that the additional participant is not available join the communication session;
determine, based on the calendar information, availability of the two or more participants and the additional participant for a future communication session at a future time that includes two or more participants and the additional participant; and
schedule the future communication session for the two or more participants and the additional participant based on the determined availability of the two or more participants and the additional participant at the future time.

17. The non-transitory processor readable storage medium of claim 16, wherein the instructions that cause the processor to monitor comprise instructions that cause the processor to monitor one or more of: voice audio of the two or more participants, instant messages exchanged between the two or more participants, video of the two or more participants, and content shared during the meeting by the two or more participants.

18. The non-transitory processor readable storage medium of claim 17, wherein the instructions that cause the processor to monitor comprise instructions that cause the processor to determine one or more subject matter terms and/or names of one or more other persons in the interactions.

19. The non-transitory processor readable storage medium of claim 18, further comprising instructions that cause the processor to analyze, based on the one or more subject matter terms and/or names, one or more of: a personal contacts directory and persons in an enterprise social network community of the participants in the meeting, to identify the additional participant.

20. The non-transitory processor readable storage medium of claim 16, further comprising instructions that cause the processor to generate for presentation to the two or more participants a prompt inquiring as to whether the additional participant should be contacted to join the communication session.

* * * * *